(12) United States Patent
Tsukamoto

(10) Patent No.: US 7,672,341 B2
(45) Date of Patent: Mar. 2, 2010

(54) TRANSMISSION APPARATUS AND RECEPTION INTERFACE APPARATUS

(75) Inventor: Keiichiro Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1230 days.

(21) Appl. No.: 10/920,781

(22) Filed: Aug. 18, 2004

(65) Prior Publication Data

US 2005/0213614 A1 Sep. 29, 2005

(30) Foreign Application Priority Data

Mar. 29, 2004 (JP) ............................... 2004-094205

(51) Int. Cl.
  *H04J 3/02* (2006.01)
(52) U.S. Cl. .................... 370/539; 370/222; 370/406
(58) Field of Classification Search ......... 370/216–218, 370/221–225, 236, 236.1, 241.1, 242, 244, 370/259, 358, 359, 404, 452, 471, 473, 474, 370/475, 408, 465, 466, 537, 392, 401, 907, 370/513, 391, 390; 379/88.17; 714/776, 714/781, 819; 703/21; 398/8; 345/545
See application file for complete search history.

(56) References Cited

U.S. PATENT DOCUMENTS

| | | | |
|---|---|---|---|
| 5,185,736 A * | 2/1993 | Tyrrell et al. ................. | 370/358 |
| 5,257,261 A * | 10/1993 | Parruck et al. ............... | 370/522 |
| 5,600,653 A * | 2/1997 | Chitre et al. ................. | 370/474 |
| 5,682,257 A * | 10/1997 | Uchida .......................... | 398/43 |
| 5,805,568 A * | 9/1998 | Shinbashi .................... | 370/223 |
| 5,857,092 A * | 1/1999 | Nakamura et al. ............ | 710/62 |
| 6,021,112 A | 2/2000 | Sugawara | |
| 6,490,273 B1 * | 12/2002 | DeNap et al. ................ | 370/352 |
| 6,587,527 B1 * | 7/2003 | Tani et al. .................... | 375/357 |
| 6,879,667 B1 * | 4/2005 | Carew et al. .............. | 379/88.17 |
| 6,920,113 B1 * | 7/2005 | Kovvali et al. .............. | 370/255 |
| 6,973,084 B1 * | 12/2005 | Jha ............................. | 370/392 |
| 7,075,952 B1 * | 7/2006 | Torma et al. ................. | 370/538 |
| 7,173,936 B1 * | 2/2007 | Semaan .................. | 370/395.51 |
| 2003/0035445 A1 * | 2/2003 | Choi ........................... | 370/535 |
| 2003/0053451 A1 * | 3/2003 | Medhat ....................... | 370/357 |
| 2003/0137932 A1 * | 7/2003 | Nishioka et al. ............ | 370/216 |
| 2004/0028051 A1 * | 2/2004 | Etemadi et al. ........... | 370/395.1 |
| 2004/0146005 A1 * | 7/2004 | Rim ............................ | 370/217 |

(Continued)

FOREIGN PATENT DOCUMENTS

JP        10-023053        1/1998

*Primary Examiner*—Aung S Moe
*Assistant Examiner*—Vinncelas Louis
(74) *Attorney, Agent, or Firm*—Katten Muchin Rosenman LLP

(57) ABSTRACT

An ADM apparatus includes a first synchronism section for detecting synchronism when a reception frame received from a reception port is a first frame, a fault information detection section for detecting whether or not fault information is set in a first predetermined region of an overhead of the first frame and outputting a signal representative of whether or not the fault information is set, a second synchronism section for detecting synchronism when the reception frame is a second frame, a third synchronism section for detecting synchronism when the reception frame is a third frame accommodated in the second frame, and an inhibit section for invalidating the output signal of the fault information detection section if, when the synchronism is detected by the first and second synchronism sections, synchronism is detected with regard to the preceding frame by the second synchronism section.

14 Claims, 13 Drawing Sheets

U.S. PATENT DOCUMENTS

2004/0162718 A1* 8/2004 Watkins et al. ................ 703/21
2006/0197767 A1* 9/2006 Ward .......................... 345/545
2009/0129772 A1* 5/2009 Trudel et al. ................... 398/8
2009/0141719 A1* 6/2009 Roy et al. ................... 370/390

* cited by examiner

FIG. 8

| POI | POI code | Associated POH |
|---|---|---|
| P 11 | 00101100 | Z 6 |
| P 10 | 00101001 | Z 5 |
| P 9 | 00100101 | Z 4 |
| P 8 | 00100000 | Z 3 |
| P 7 | 00011100 | Z 2 |
| P 6 | 00011001 | Z 1 |
| P 5 | 00010101 | X |
| P 4 | 00010000 | B1 |
| P 3 | 00001101 | G1 |
| P 2 | 00001000 | X |
| P 1 | 00000100 | X |
| P 0 | 00000001 | C1 |

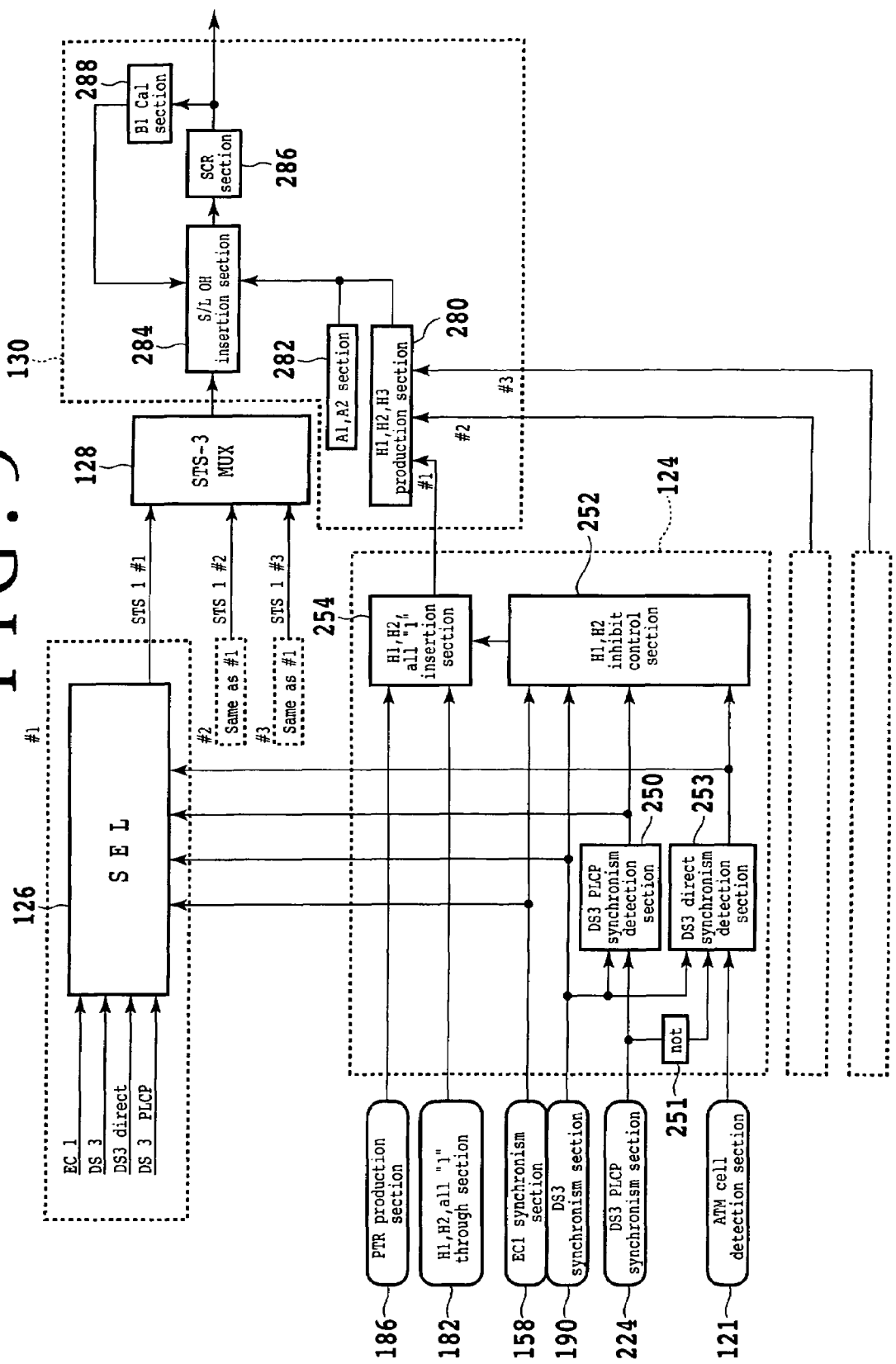

FIG.10A

Upon reception of preceding frame DS3 PLCP

| | | EC1 | |
|---|---|---|---|
| | | Synchronism detected | Out-of-synchronism |
| DS3 PLCP | Synchronism detected | All "1" through inhibit valid, DS3 signal outputted (preceding state referential) | All "1" through inhibit valid, DS3 signal outputted |
| | Out-of-synchronism | All "1" through inhibit invalid, EC1 signal outputted | All "1" through inhibit valid, DS3 signal outputted (preceding state maintained) |

FIG.10B

Upon reception of preceding frame EC1

| | | EC1 | |
|---|---|---|---|
| | | Synchronism detected | Out-of-synchronism |
| DS3 PLCP | Synchronism detected | All "1" through inhibit invalid, EC1 signal outputted (preceding state referential) | All "1" through inhibit valid, DS3 signal outputted |
| | Out-of-synchronism | All "1" through inhibit invalid, EC1 signal outputted | All "1" through inhibit invalid, EC1 signal outputted (preceding state maintained) |

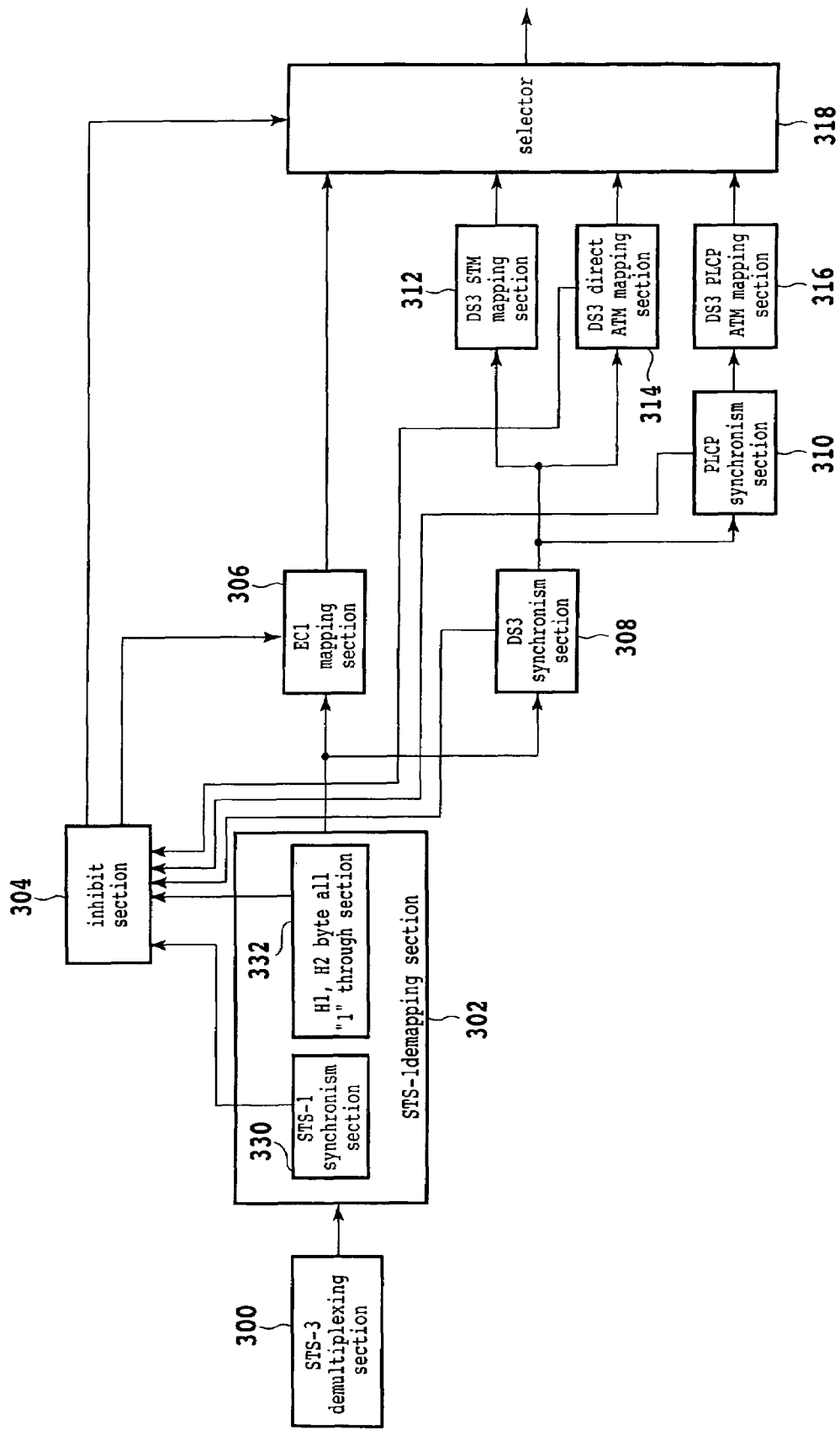

TRANSMISSION APPARATUS AND RECEPTION INTERFACE APPARATUS

BACKGROUND OF THE INVENTION

1. Field of the Invention

This invention relates to an add drop multiplexer (ADM) (hereinafter referred to as transmission apparatus) and a reception interface apparatus for use with a new synchronous communication network complying with the SONET (Synchronous Optical NETwork, ANSI TI-105) standards or the TTC (Telecommunication Technology Committee) standards (refer to JT-G707, JT-G708, JT-G709) in Japan.

2. Description of the Related Art

North American transmission networks at present include networks of a North American asynchronous signal (hereinafter referred to as DSn (n=1, 3) networks) and a network of a North American synchronous (SONET) signal (hereinafter referred to as SONET network). The DSn networks, for example, the DS3 network, uses 44.736 Mbps.

An STM frame in the DS3 signal accommodates sound data of a fixed bit rate (64 kbps) or an ATM (Asynchronous Transfer Mode) cell in a PLCP format or a direct format. Meanwhile, as the SONET network, a low speed network of the EC1 (51.84 Mbps) which is a SONET electric interface is available.

In a transmission apparatus which accommodates a SONET network, when no signal comes because a physical circuit is disconnected (Los OF Signal), when no frame synchronism can be established (Los of Frame) or when an alarm is received from a network on the downstream side (AIS), in order to quicken the time for transmission of an AIS in case of a line trouble, the H1 and H2 bytes of the line overhead of the SONET frames are set to all "1s" and a fixed bit pattern is inserted in the payload of the SONET frames so that the data may pass through thereby to rapidly notify a transmission apparatus, which accommodates a SONET network on the reception side, of the occurrence of the line trouble.

It is demanded for a transmission apparatus (a) to support a network configuration which includes a DSn network and a SONET network and (b) to support any one of an EC1 network and a DS3 network selected by a user on one transmission line. For the support of (b), a reception circuit connected to the transmission line includes a DS3 reception circuit and an EC1 reception circuit such that it can operate whichever one of a DS3 network and an EC1 network is connected to a reception port thereof.

FIGS. 13A to 13C illustrate blocks which relate to an adding operation of a conventional ADM apparatus. The blocks multiplex an EC1 frame or a DS3 frame into an STS-1 frame and further multiplex three STS-1 frames into an STS-3 frame.

Referring first to FIG. 13A, a DS3 reception circuit 2 establishes synchronism with a DS3 frame. If the DS3 frame is a PLCP frame, then the DS3 reception circuit 2 establishes synchronism with the PLCP frame and processes an ATM cell mapped in the PLCP frame. If the DS3 frame includes a DS3 direct STM signal (sound) mapped therein, then the DS3 reception circuit 2 performs a direct STM process. If the DS3 frame includes a DS3 direct ATM cell, then the DS3 reception circuit 2 performs a direct ATM process.

An EC1 reception circuit 4 establishes synchronism with an EC1 frame and performs an EC1 frame process after the synchronism with the EC1 frame is established. An H1, H2 byte all "1" through section 6 detects an H1, H2 byte all "1" of the overhead of an EC1 frame, and sets, if the all "1" is detected, the H1, H2 bytes to all "1s" to instruct an STS-3 OH insertion section 14 of a path AIS.

An STS-1 MUX 8 maps an EC1 frame, a DS3 direct STM frame, a DS3 direct ATM frame and a DS3 PLCP frame outputted from the EC1 reception circuit 4 and the DS3 reception circuit 2 into an STS-1 frame. A selector (SEL) 10 selects, depending upon which one of an EC1 frame, a DS3 direct STM frame, a DS3 direct ATM frame and a DS3 PLCP frame should be received as a reception frame, an STS-1 frame in which the pertaining frame is mapped.

An STS-3 OH insertion section 14 produces an STS-3 overhead and inserts, if the H1, H2 byte all "1" is detected by the H1, H2 byte all "1" through section 6, all "1s" into the H1, H2 bytes of the STS-3 frame. An STS-3 MUX section 12 maps the payloads of three STS-1 frames into an STS-3 frame. The STS-3 frame is signaled into the transmission line.

For example, if a DS3 PLCP frame is received as seen in FIG. 13B, then an STS-3 frame in which the DS3 PLCP frame is mapped is signaled into the transmission line.

Even when a DS3 PLCP frame is received, since a frame timing pattern of the DS3 PLCP frame and a framing pattern of an EC1 frame coincide with each other at "F628" as hereinafter described, the EC1 reception circuit 4 sometimes recognizes the DS3 PLCP frame as an EC1 frame.

In this instance, if the contents at the positions corresponding to the H1, H2 of the DS3 PLCP frame are all "1s", then the H1, H2 byte all "1" through section 6 detects the H1, H2 byte all "1". The selector 10 selects an STS-1 frame in which the DS3 PLCP frame is mapped and outputs the STS-1 frame to the STS-3 MUX section 12. However, since the H1, H2 byte all "1" is detected, the STS-3 OH insertion section 14 sets a path AIS of the H1, H2 byte all "1" as seen in FIG. 13C.

Therefore, on the reception side of the STS-3 frame, since the H1, H2 byte all "1" is set, it is discriminated that a path AIS has occurred, and the payloads are ignored. Consequently, the DS3 PLCP frame is not accepted by the reception side.

Similarly, also upon dropping of an STS-1 frame, when a framing pattern of a PLCP frame is recognized as a framing pattern of an STS-1 frame and it is detected that the H1, H2 bytes of the PLCP frame are all "1s", the PLCP frame is not transmitted to the reception side, but an EC1 frame having the H1, H2 bytes in which all "1s" are placed is transmitted to the reception side.

Japanese Patent Laid-Open No. Hei 10-23053 is available as a related art document and hereinafter referred to as Patent Document 1.

The Patent Document 1 discloses a transmission apparatus which supervises a PHD signal and, if degradation of the PHD signal is detected, produces path overhead information for a transmission alarm signal and inserts the information into the path overhead of an SDH signal to notify the reception side of the transmission alarm signal.

However, the related art transmission apparatus has the following problems.

As described hereinabove, when a DS3 PLCP frame is received, if the EC1 reception circuit 4 recognizes the DS3 PLCP frame as an EC1 frame, then if the bit values at the H1, H2 byte positions of the DS3 PLCP frame are all "1s", then the transmission side inserts a path AIS and inserts a fixed bit pattern into the corresponding payload. Consequently, there is a problem that the DS3 PLCP frame does not reach the reception side. Even the Patent Document 1 cannot solve this problem.

Also when an STS-1 frame is to be dropped into an EC1/DS3 PLCP frame or the like, STS-1 frame synchronism is established based on the framing byte of the DS3 PLCP frame, and if the H1, H2 byte all "1" is detected based on the synchronism, then an AIS is signaled to the line side and a fixed bit pattern is inserted into the corresponding payload. Consequently, there is a problem that the PLCP frame cannot be signaled.

SUMMARY OF THE INVENTION

It is an object of the present invention to provide a transmission apparatus and a reception interface apparatus by which, even if a DS3 PLCP frame is recognized as an EC1 frame and the corresponding positions to the H1, H2 bytes of the DS3 PLCP frame are all "1s", a path AIS is not issued and the DS3 PLCP frame can be transmitted to and received by the reception side.

According to an aspect of the present invention, there is provided a transmission apparatus, comprising a first synchronism section for detecting synchronism of a reception frame based on a first framing pattern of a first type frame, a second synchronism section for detecting synchronism of the reception frame based on a second framing pattern of a second type frame, a mapping section for mapping the reception frame to a third type frame based on the detections of synchronism by the first and second synchronism sections, and an inhibit section for invalidating fault information set in the third type frame when the first synchronism section has detected the synchronism formerly and the first and second synchronism sections currently detect the synchronism.

According to another aspect of the present invention, there is provided a transmission apparatus, comprising a first synchronism section for detecting synchronism when a reception frame received from a reception port is a first type frame of a first framing pattern, a fault information detection section for detecting, based on the detection of synchronism by the first synchronism section, whether or not fault information is set in a first predetermined region of an overhead of the first type frame and outputting a signal representative of whether or not the fault information is set, a second synchronism section for detecting synchronism when the reception frame received from the reception port is a second type frame, a third synchronism section for detecting synchronism when the reception frame received from the reception port is a third type frame accommodated in the second type frame and having a second framing pattern same as the first framing pattern, a mapping section for mapping, based on the synchronism detected by the first, second and third synchronism sections, data accommodated in one of the first type frame, second type frame and third type frame to a fourth type synchronous frame, an inhibit section for invalidating the output signal of the fault information detection section if it is discriminated, when the synchronism is detected by the first, second and third synchronism sections, that the synchronism is detected with regard to the preceding frame by the second and third synchronism sections and the third type frame is being received, a multiplexing section for multiplexing the fourth type synchronous frame into a fifth type synchronous frame, and an overhead insertion section for inserting an overhead of the fifth type synchronous frame. The overhead insertion section does not set fault information to a second predetermined position of the overhead when the output signal of the fault information detection section is invalidated by the inhibit section.

According to a further aspect of the present invention, there is provided a reception interface apparatus, comprising a first synchronism section for detecting synchronism when a reception frame received from a reception port is a first type frame of a first framing pattern, a fault information detection section for detecting, based on the frame synchronism detected by the first detection section, whether or not fault information is set in a first predetermined region of an overhead of the first type frame and outputting a signal representative of whether or not the fault information is set, a second synchronism section for detecting synchronism when the reception frame received from the reception port is a second type frame, a third synchronism section for detecting synchronism when the reception frame received from the reception port is a third type frame accommodated in the second type frame and having a second framing pattern same as the first framing pattern, a first mapping section for mapping, based on the synchronism detected by the first, second and third synchronism sections, data accommodated in one of the first type frame, second type frame and third type frame to a fourth type synchronous frame, and an inhibit section for invalidating the output signal of the fault information detection section if it is discriminated, when the synchronism is detected by the first, second and third synchronism sections, that the synchronism is detected with regard to the preceding frame by the second and third synchronism sections and the third type frame is being received.

According to a still further aspect of the present invention, there is provided a transmission apparatus, comprising a first demultiplexing section for demultiplexing a first type synchronous frame received from a synchronous network into a plurality of second type synchronous frames, a first synchronism section for establishing synchronism with a first framing pattern of the second type synchronous frames, a first demapping section for detecting fault information set in an overhead of the second type synchronous frame and demapping the fault information to a payload of the second type synchronous frame, a first mapping section for mapping the payload to a third type synchronous frame, a second synchronism section for establishing synchronism when the payload is a fourth type frame, a third synchronism section for establishing synchronism with a fifth type frame of a second framing pattern same as the first framing pattern when the payload is accommodated in the fourth type frame and includes the fifth type frame, a second mapping section for mapping the payload to the fourth type frame which accommodates the fifth type frame, and an inhibit section for invalidating the fault information when synchronism is detected by the second and third synchronism sections.

The above and other objects, features and advantages of the present invention and the manner of realizing them will become more apparent, and the invention itself will best be understood from a study of the following description and the appended claims with reference to the attached drawings showing some preferred embodiments of the presenting invention.

BRIEF DESCRIPTION OF THE DRAWINGS

FIG. 8 is a view illustrating POI codes and POHs;

FIG. 9 is a block diagram showing an inhibit section shown in FIG. 3;

FIGS. 10A and 10B are views illustrating truth values representing operation of an H1, H2 inhibit control section shown in FIG. 9;

FIG. 12 is a block diagram showing a dropping section of the transmission apparatus shown in FIG. 2.

DETAILED DESCRIPTION OF THE PREFERRED EMBODIMENTS

Figure 1:
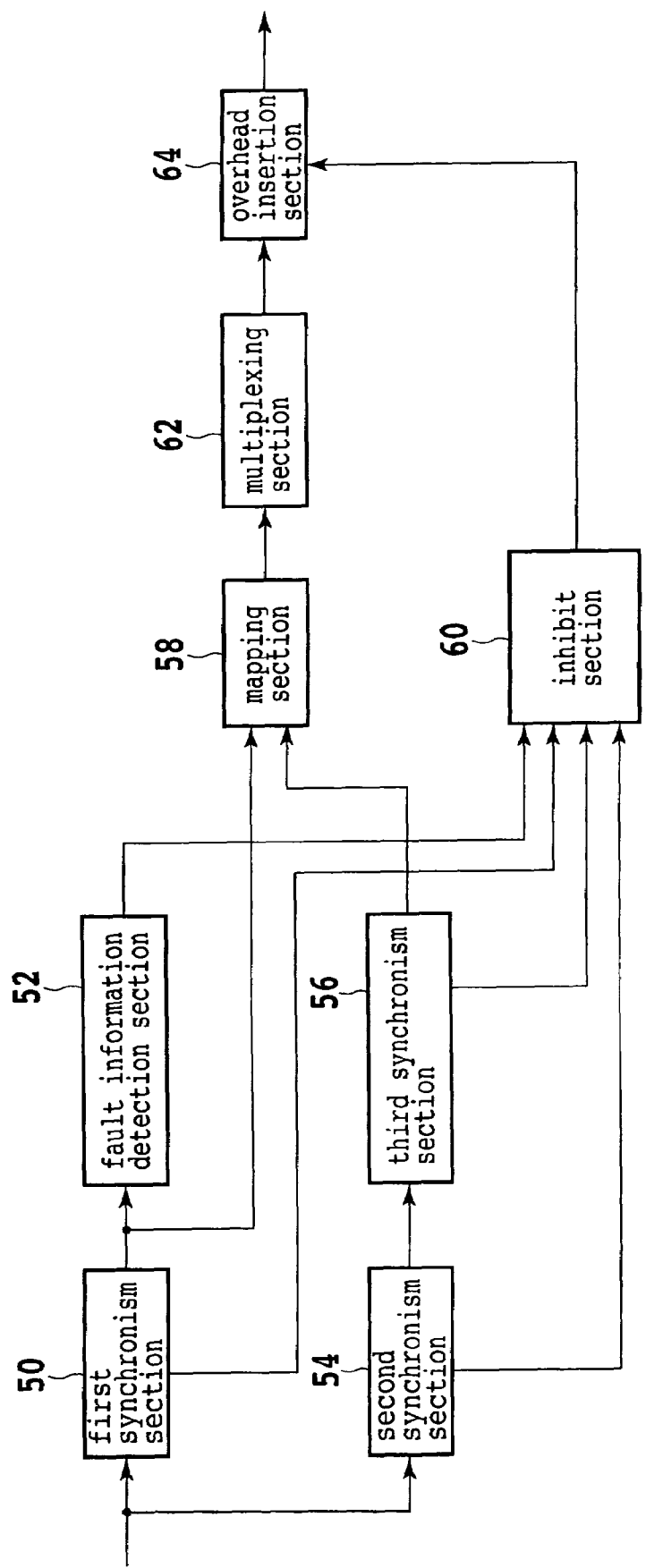
FIG. 1 is a block diagram illustrating a principle of the present invention;.

Before a preferred embodiment of the present invention is described, a principle of the present invention is described. Referring to FIG. 1, a transmission apparatus according to the present invention includes a first synchronism section 50, a fault information detection section 52, a second synchronism section 54, a third synchronism section 56, a first mapping section 58, an inhibit section 60, a multiplexing section 62 and an overhead insertion section 64.

The first synchronism section 50 detects synchronism when a reception frame received from one reception port is a first type frame of a first framing pattern. The fault information detection section 52 detects based on the synchronism detection by the first synchronism section 50 whether or not fault information is set in a first predetermined region of the overhead of the first type frame and outputs a signal representative of whether or not such fault information is set.

The second synchronism section 54 detects synchronism when the reception frame received from the reception port is a second type frame. The third synchronism section 56 detects synchronism with a third type frame accommodated in the second type frame and having a second framing pattern same as the first framing pattern.

The first mapping section 58 maps data accommodated in one of the first type frame, second type frame and third type frame to a fourth type synchronous frame based on the synchronism by the first to third synchronism sections 50, 54 and 56. The inhibit section 60 invalidates the output signal of the fault information detection section 52 when synchronism is detected by the first synchronism section 50 and the third synchronism section 56 and besides synchronism is detected in the preceding frame by the third synchronism section 56.

The multiplexing section 62 multiplexes the fourth type synchronous frame with the payload of a fifth type synchronous frame. The overhead insertion section 64 does not set fault information to a second predetermined position of the overhead when the output signal of the fault information detection section 52 is invalidated by the inhibit section 60.

Consequently, even if fault information is detected, if synchronism is detected by the first synchronism section 50 and synchronism is detected by the third synchronism section 56 and besides the synchronism has been detected formerly by the third synchronism section 56, it is determined that the first synchronism section 50 has detected the synchronism in error from the framing pattern of the third type frame, and the fault information is invalidated. Therefore, the third type frame can be accommodated in and transmitted together with the fifth type frame.

Figure 2:
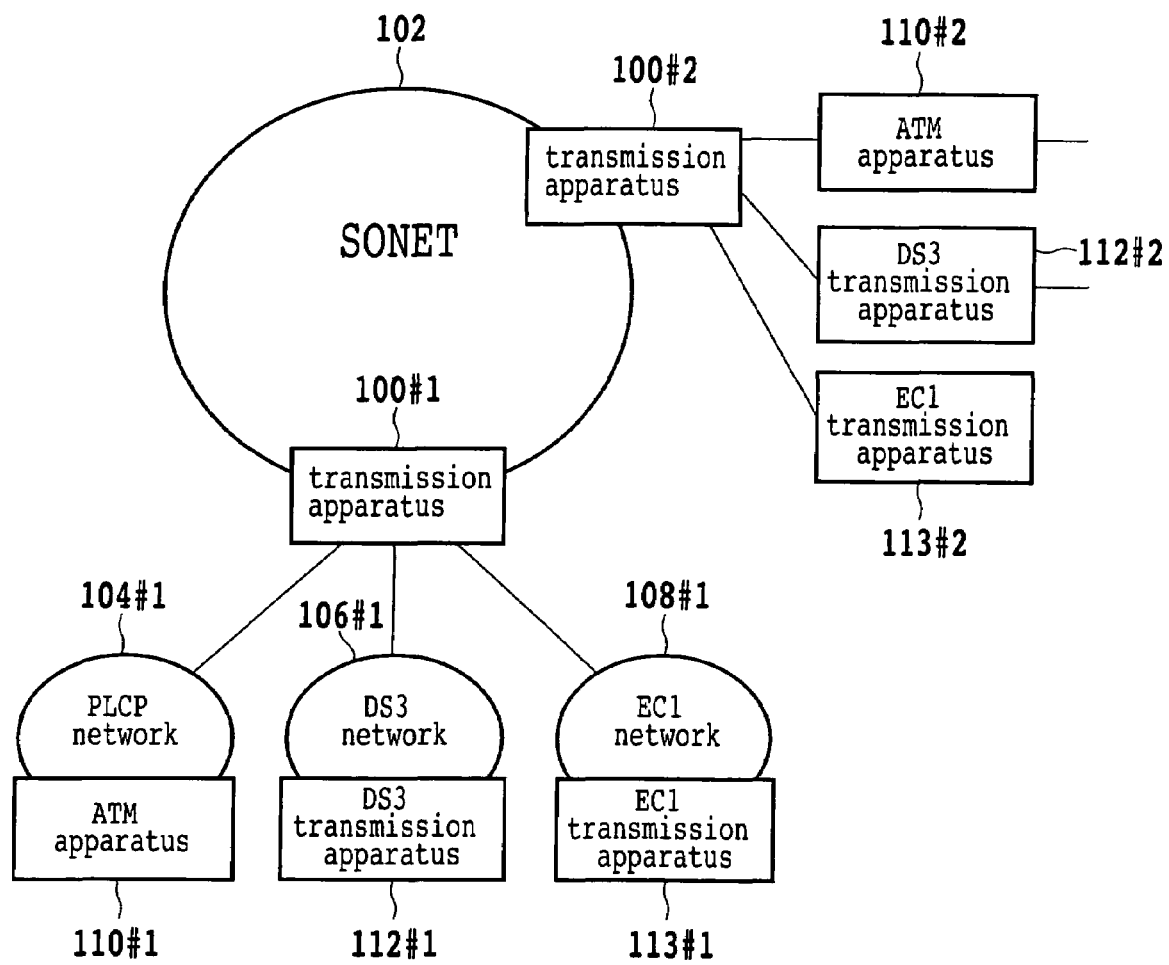
FIG. 2 is a block diagram showing a configuration of a network which includes a transmission apparatus to which the present invention is applied.

FIG. 2 shows a configuration of a network which includes a transmission apparatus to which the present invention is applied. Referring to FIG. 2, the network shown includes transmission apparatus 100#1 and 100#2 and an optical fiber 102 and is formed as a new synchronous communication network of the SONET or TTC standards, for example, as an STS-3 network.

The transmission apparatus 100#1 and 100#2 are ADM apparatus which support one of an asynchronous network and a synchronous network at each input port. The transmission apparatus 100#1 accommodates a plurality of networks, for example, an ATM PLCP network 104#1 of 44.736 Mbps, a DS3 network 106#1 of 44.736 Mbps and an EC1 network 108#1 of 51.84 Mbps.

The transmission apparatus 100#1 multiplexes an ATM PLCP frame, a DS3 frame and an EC1 frame into an STS-3 frame and adds the STS-3 frame to the SONET (STS-3) 102. Further, the transmission apparatus 100#1 receives an STS-3 frame from the SONET 102 and demaps the STS-3 frame to drop a PLCP frame to the PLCP network 104#1, a DS3 frame to the DS3 network 106#1 and an EC1 frame to the EC1 network 108#1.

The transmission apparatus 100#2 receives an STS-3 frame from the SONET 102 and demaps the STS-3 frame to drop a PLCP frame to an ATM apparatus 110#2, a DS3 frame to a DS3 transmission apparatus 112#2 and an EC1 frame to a EC1 transmission apparatus 113#2.

When each of the ATM apparatus 110#1 and 110#2 receives a PLCP frame from the transmission apparatus 100#1 or 100#2, it decomposes the PLCP frame into ATM cells and transmits the cells to a transmission line accommodated therein. When it receives ATM cells from the transmission line, it maps the ATM cells into a PLCP frame and transmits the PLCP frame to the PLCP network 104#1 and so forth.

When each of the DS3 transmission apparatus 112#1 and 112#2 receives a DS3 direct frame from the transmission apparatus 100#1 or 100#2, it demaps the DS3 direct frame to data and ATM cells and transmits them to the transmission line accommodated therein. When it receives data and ATM cells, it maps them to a DS3 direct frame and transmits the DS3 direct frame to the DS3 network 106#1 and so forth.

When each of the EC1 transmission apparatus 113#1 and 113#2 receives an EC1 frame from the transmission apparatus 100#1 or 100#2, it decomposes the EC1 frame into a payload and transmits the payload to the transmission line accommodated therein. When it receives data (ATM cells, sound data) from the transmission line, then it maps the data to an EC1 frame and transmits the EC1 frame to the EC1 network 108#1 and so forth.

Figure 3:
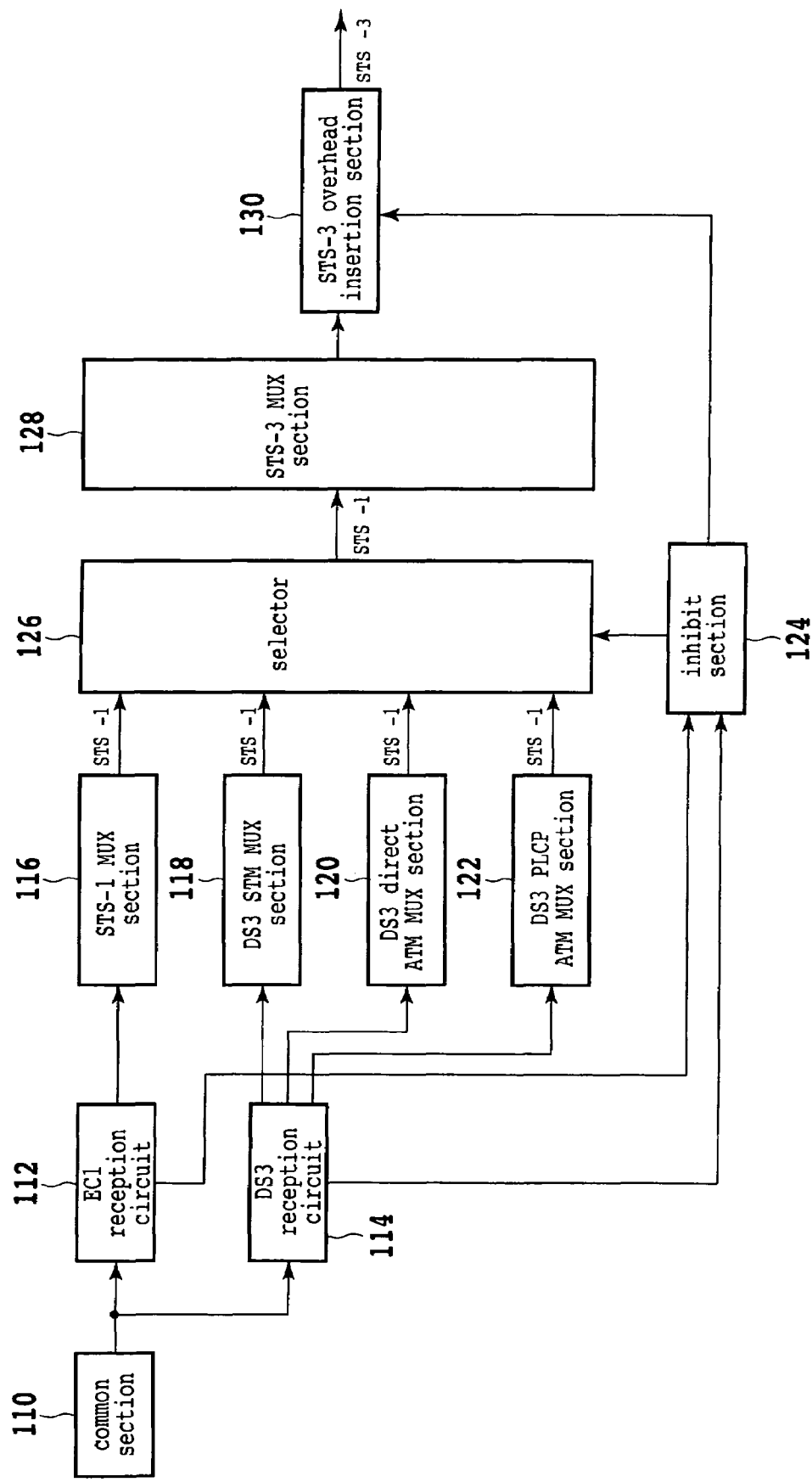
FIG. 3 is a block diagram showing blocks of the transmission apparatus shown in FIG. 2 which relate to an adding operation.

FIG. 3 is a block diagram showing those blocks of the transmission apparatus 100#1 which relate to an adding operation. Referring to FIG. 3, the blocks which relate to an adding operation of the transmission apparatus 100#1 include a common section 110, an EC1 reception circuit 112, a DS3 reception circuit 114, an STS-1 MUX section 116, a DS3 STM MUX section 118, a DS3 direct ATM MUX section 120, a DS3 PLCP ATM MUX section 122, an inhibit section 124, a selector 126, an STS-3 MUX section 128 and an STS-3 overhead insertion section 130.

Figure 4:
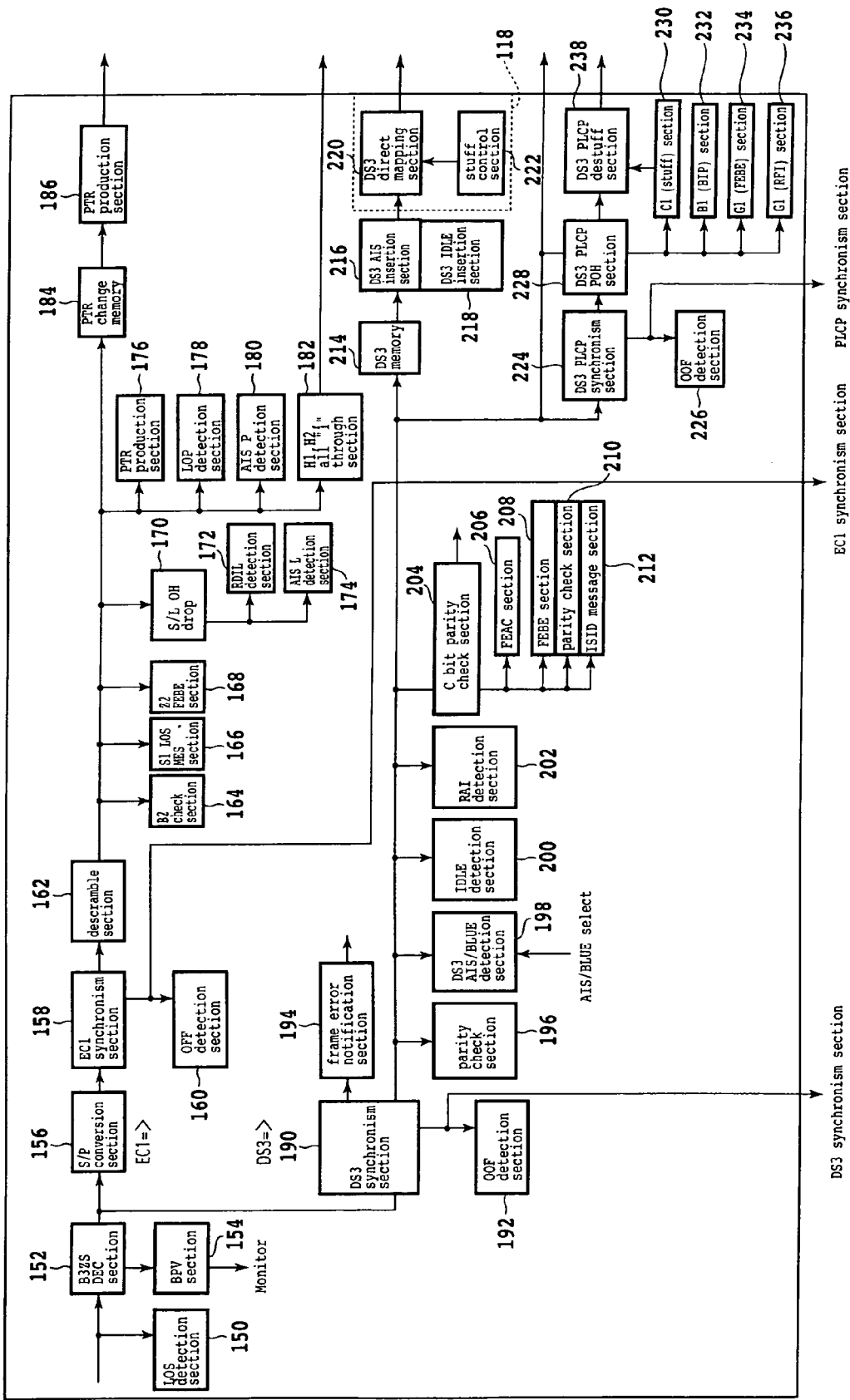
FIG. 4 is a block diagram showing a reception circuit shown in FIG. 3.

FIG. 4 is a functional block diagram of the common section 110, EC1 reception circuit 112 and DS3 reception circuit 114. Referring to FIG. 4, the common section 110 includes an LOS detection section 150, a B3ZS DEC section 152 and a BPV section 154. The LOS detection section 150 detects an alarm of a line fault (LOS OF SIGNAL). The B3ZS DEC section 152 decodes an input B3ZS code. The BPV section 154 detects a bipolar violation code rule error.

The EC1 reception circuit 112 includes an S/P conversion section 156, an EC1 synchronism section 158, an OOF detection section 160, a descramble section 162, a B2 check section 164, an S1 LOS MES (message) section 166, a Z2 FEBE section 168, an S/L OH drop section 170, an RDIL detection section 172, an AIS L detection section 174, a PTR detection section 176, an LOP detection section 178, an AIS P detection section 180, an H1, H2, all "1" through section 182, a PTR change memory 184 and a PTR production section 186.

Figure 5:
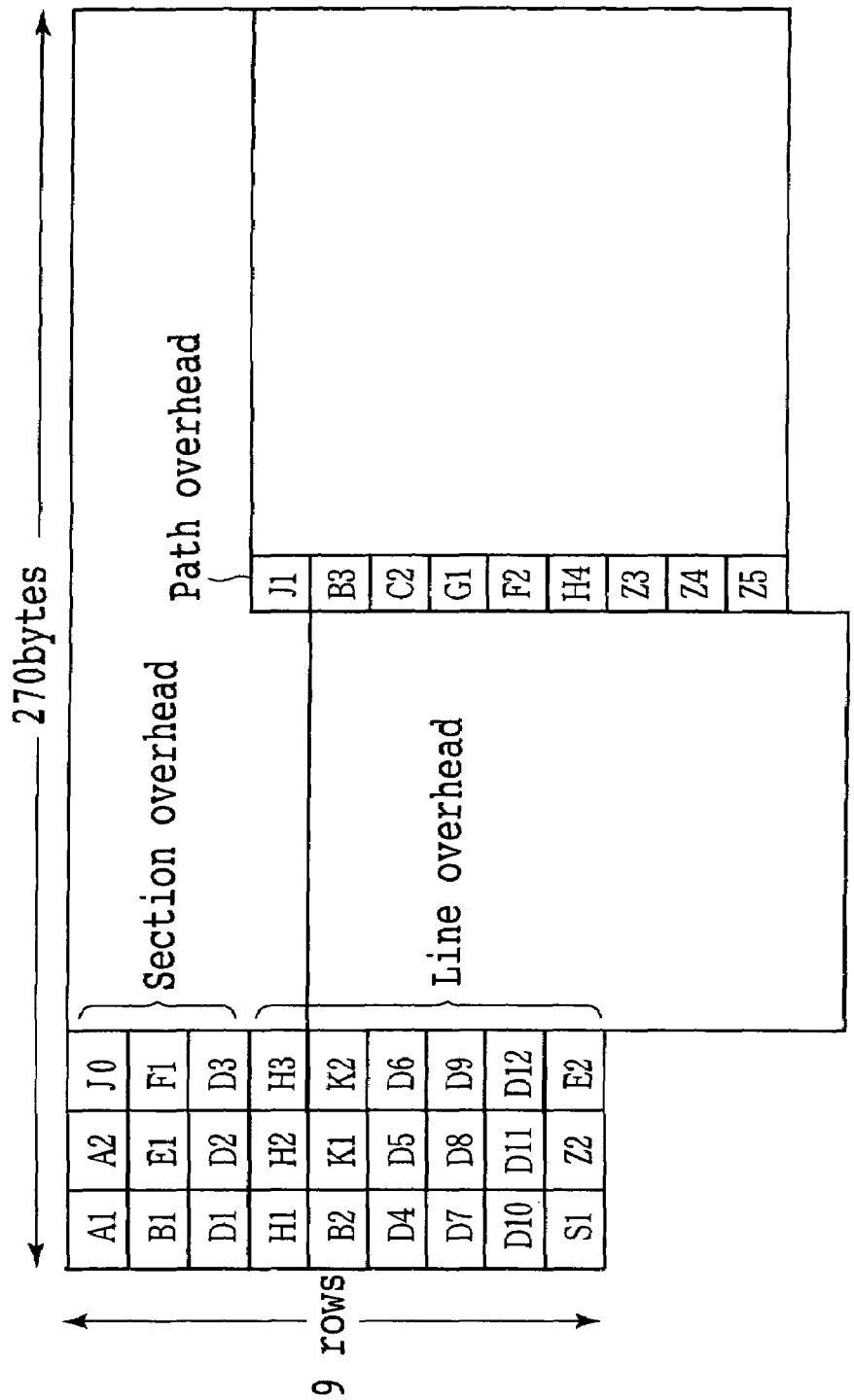
FIG. 5 is a diagrammatic view showing an EC1 frame format.

FIG. 5 shows a configuration of the EC1 frame format. Referring to FIG. 5, the EC1 frame includes a section overhead, a line overhead, a path overhead and a payload. The section overhead includes A1, A2 bytes, a B1 byte, a J0 byte, D1 to D3 bytes, an E1 byte, an F1 byte, and H1 to H3 bytes. The line overhead includes a B2 byte, K1, K2 bytes, D4 to D12 bytes, an S1 byte, Z2 byte and E2 byte.

The path overhead includes a J1 byte, a B3 byte, a C2 byte, a G1 byte, an F2 byte, an H4 byte and Z3 to Z5 bytes. The A1, A2 bytes are framing bytes for establishing EC1 frame synchronism, and the code thereof is "F628".

The S/P conversion section 156 converts serial frame data into 8-bit parallel data. The EC1 synchronism section 158 establishes synchronism with an EC1 frame and outputs a frame pulse representative of the top of the EC1 frame together with the EC1 frame. Since the framing pattern of the EC1 frame and the framing pattern of the DS3 PLCP frame are "F628" and same as each other, EC1 frame synchronism is sometimes detected even with a DS3 PLCP frame.

The OOF detection section 160 detects out-of-synchronism. The descramble section 162 descrambles scrambled EC1 frames. The B2 check section 164 checks the parity of the B2 byte.

The S1 LOS message section 166 detects a synchronism message of the Si byte. The Z2 check section 168 detects a B2 error of an opposed station from the Z2 byte. The S/L OH drop section 170 drops the section/line overheads (except the B2, S1 and Z2 bytes). The RDIL detection section 172 detects an RDI_L alarm from the K2 byte. The AIS L detection section 174 detects an AIS_L alarm.

The PTR detection section 176 detects a pointer value from the H1, H2 bytes. The LOP detection section 178 detects an LOP (Loss of Pointer) from the H1, H2 bytes. The AIS P detection section 180 detects an AIS-P alarm from the H1, H2 bytes.

The H1, H2, all "1" through section 182 detects that the H1, H2 bytes are all "1s" based on a frame pulse representative of the top of an EC1 frame produced by the EC1 synchronism section 158. At this time, even if out-of-synchronism temporarily occurs with the EC1 synchronism section 158, the H1, H2 byte all "1" is detected at a timing synchronized with the immediately preceding frame pulse.

The PTR change memory 184 is a memory for replacing the clock for a frame from the reception side clock to the apparatus side clock. The PTR production section 186 inserts a pointer action for incrementing/decrementing of a pointer. The STS-1 MUX section 116 in FIG. 3 maps the section overhead, line overhead, path overhead and payload of an STS-1 frame to an STS-1 frame.

The DS3 reception circuit 114 includes a DS3 synchronism section 190, an OOF detection section 192, a frame error notification section 194, a parity check section 196, a DS3 AIS/BLUE detection section 198, an IDLE detection section 200, an RAI detection section 202, a C bit parity check section 204, an FEAC section 206, an FEBE section 208, a parity check section 210, an ISID message section 212, a DS3 memory 214, a DS3 AIS insertion section 216, a DS3 IDLE insertion section 218, a DS3 direct mapping section 220, a stuff control section 222, a DS3 PLCP synchronism section 224, an OOF section 226, a DS3 PLCP POH section 228, a C1 section 230, a B1 section 232, a G1 (FEBE) section 234, a G1 (RF1) section 236 and a DS3 PLCP destuff section 238.

Figure 6:
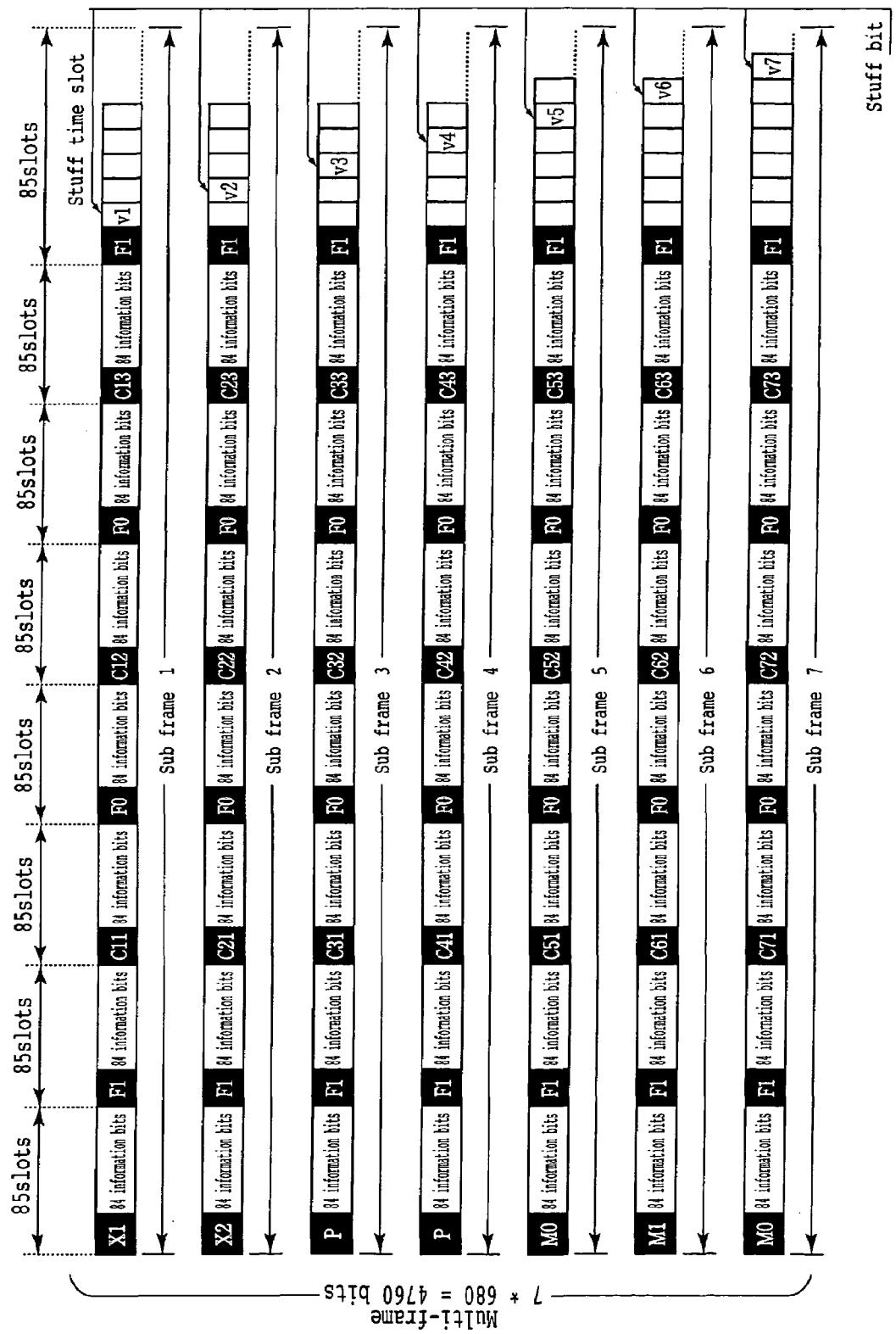
FIG. 6 is a diagrammatic view showing a DS3 frame format.

FIG. 6 illustrates the DS3 frame format. Referring to FIG. 6, the DS3 frame has a multi-frame configuration which includes slots of 85 bits formed in a matrix wherein eight slots are arranged along a horizontal row and seven slots are arranged along a vertical column. The X1 to X2, F0, F1, C11 to C71, C12 to C72, C13 to C71, P and M0 to M1 bits are arranged individually as the top bits of the slots of 85 bits and are used for frame synchronization, parity check, stuff control and so forth.

The DS3 synchronism section 190 detects synchronism from the F0, F1, M0 and M1 bits of the DS3 frame. The OOF detection section 192 detects out-of-synchronism of the DS3 frame. The frame error notification section 194 counts frame errors and displays the frame error count on a monitor. The parity check section 196 performs P-bit parity check. The DS3 AIS/BLUE detection section 198 detects a DS3 AIS alarm from the X1, X2 bits.

The IDLE detection section 200 detects an IDLE signal. The RAI detection section 202 detects a remote alarm indicator (RAI) alarm. The C bit parity check section 204 checks the alarm and the status in a C-bit parity mode (STM). The FEAC section 206 detects an FEAC (Far End Alarm and Control code).

The FEBE section 208 detects an FEBE (C bit Far End Block Error). The parity check section 210 checks the P bit parity. The ISID message section 212 issues an ISID message (Idle Signal Identification) notification.

The DS3 memory 214 is a memory for replacing the clock from the reception side clock to the apparatus side clock. The DS3 AIS insertion section 216 inserts a DS3 AIS. The DS3 IDLE insertion section 218 inserts a DS3 IDLE.

The DS3 STM MUX section 118 in FIG. 3 maps a DS3 frame to an STS-1 frame. The DS3 direct mapping section 220 directly maps a DS3 STM. The stuff control section 222 controls the stuff. The DS3 direct ATM MUX section 120 detects an ATM cell by means of an ATM cell detection section 121 (FIG. 9) and extracts, when an ATM cell is detected, the ATM cell mapped in the DS3 frame, performs an HEC check and so forth for the ATM cell, assembles the ATM cell into a DS3 frame and maps the DS3 frame to an STS-1 frame.

Figure 7:
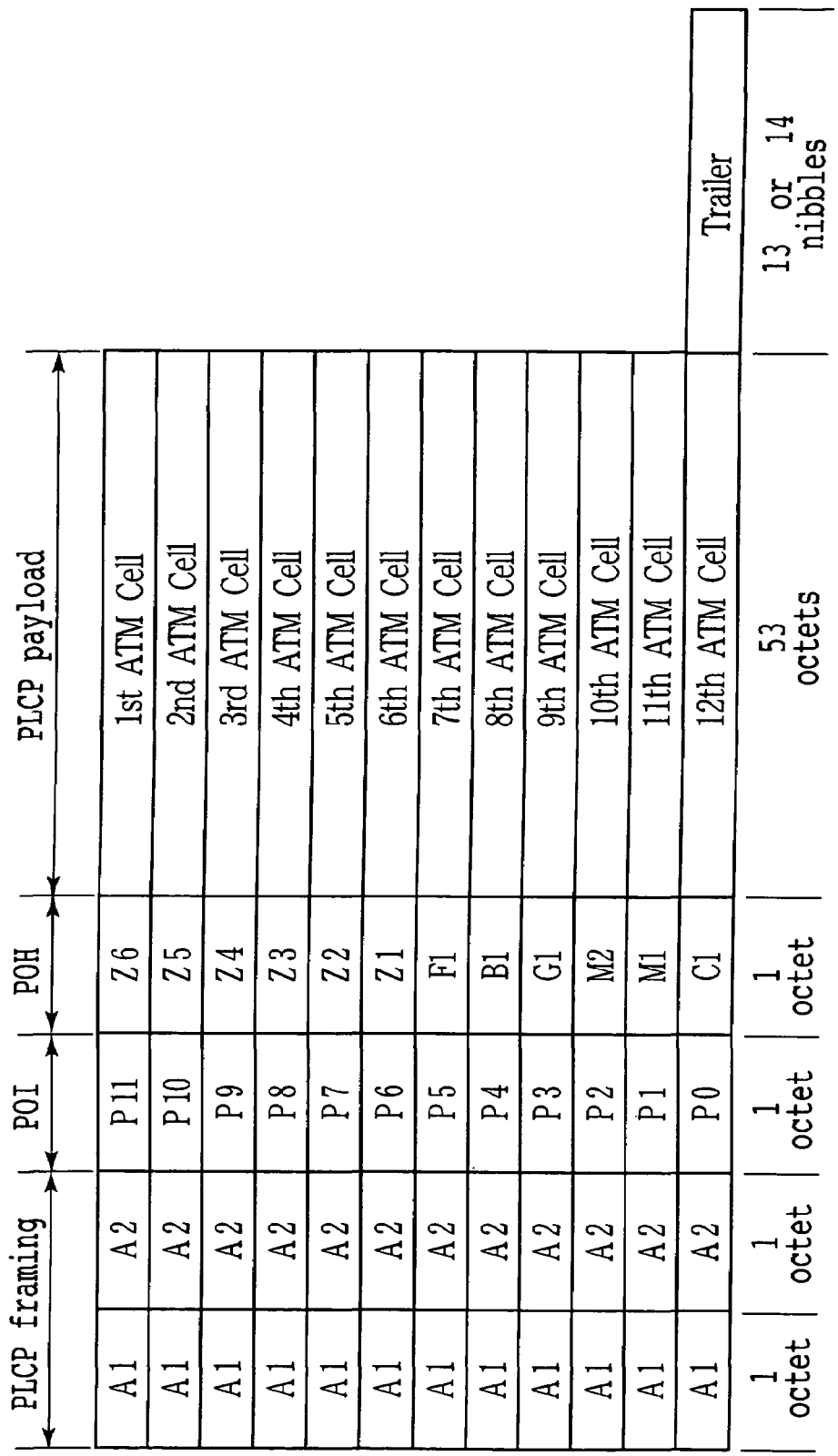
FIG. 7 is a diagrammatic view showing a PLCP frame format.

FIG. 7 shows the format of the DS3 PLCP frame. The DS3 PLCP frame is formed using slots of 84 bits of a DS3 frame arranged in such a manner as seen in FIG. 7 and has a configuration wherein two PLCP framing bytes A1, A2, a one POI byte, a one POH byte and a PLCP payload of 53 bytes are arranged in each of 12 rows juxtaposed vertically and a trailer is added to the tail of the frame. The PLCP framing bytes A1, A2 are provided for establishing PLCP frame synchronism, and the code thereof is "F628" and has an equal code value to that of the A1, A2 bytes of the EC1 frame.

FIG. 8 illustrates the POI and the POH. The POI of one byte has a pertaining POI code allocated thereto and has an associated POH allocated thereto.

The DS3 PLCP synchronism section 224 establishes synchronism of the DS3 PLCP frame. The OOF detection section 226 detects PLCP out-of-synchronism. The DS3 PLCP POH section 228 extracts the POH of the PLCP frame. The C1 section 230 controls a cycle/stuff counter. The B1 section 232 detects the B1 parity byte.

The G1 (FEBE) section 234 detects a G1FEBE (G1 Far End Block Error). The G1 (RFI) section 236 detects a G1RFI (Remote Fail Indicator). The DS3 PLCP destuff section 238 detects a C1 stuff control signal byte. The DS3 PLCP ATM MUX section 122 in FIG. 3 performs HEC check of an ATM cell, assembles the ATM cell into a DS3 PLCP frame and maps the DS3 PLCP frame to an STS-1 frame.

FIG. 9 shows the inhibit section 124 shown in FIG. 3. Referring to FIG. 9, the inhibit section 124 includes a DS3 PLCP synchronism detection section 250, a NOT circuit 251, an H1, H2 inhibit control section 252, a DS3 direct synchronism detection section 253 and an H1, H2, all "1" insertion section 254.

The DS3 PLCP synchronism detection section 250 detects, from outputs of the DS3 synchronism section 190 and the DS3 PLCP synchronism section 224, whether DS3 synchronism is established and besides PLCP synchronism is established (DS3-PLCP synchronism) and outputs a signal representative of whether or not DS3-PLCP synchronism is established.

The NOT circuit 251 inverts the output of the DS3 PLCP synchronism section 224. The DS3 direct synchronism detection section 253 outputs a signal indicating a DS3 direct ATM when DS3 synchronism is detected and PLCP synchronism is not detected and besides an ATM cell is detected.

FIG. 10A illustrates operation of the H1, H2 inhibit control section 252 upon preceding frame DS3 PLCP reception. FIG. 10B illustrates operation of the H1, H2 inhibit control section 252 upon preceding frame EC1 reception.

The preceding frame DS3 PLCP reception signifies reception when, with regard to the preceding frame, (1) DS3 PLCP synchronism is established and besides EC1 synchronism is not established or (2) DS3 PLCP synchronism is established and EC1 synchronism is established and besides the preceding state is a DS3 PLCP synchronous state (preceding state preferential). It is to be noted that the DS3 PLCP synchronous state is a state wherein both of DS3 synchronism and PLCP synchronism are established or maintained.

The preceding frame EC1 reception signifies reception when, with regard to the preceding frame, (1) EC1 synchronism is established and besides DS3 PLCP synchronism is not established or (2) EC1 synchronism is established and also DS3 PLCP synchronism is established and besides the preceding state is an EC1 synchronous state (preceding state maintained). It is to be noted that, when the power is made available, one of EC1 synchronism and DS3 PLCP synchronism, for example, DS3 PLCP synchronism, is established.

(a) Upon preceding frame DS3 PLCP reception, the H1, H2 inhibit control section 252 operates in the following manner as illustrated in FIG. 10A:

(i) when DS3 PLCP synchronism is detected and besides EC1 synchronism is detected, the H1, H2 all "1" through inhibit is valid (preceding state preferential);

(ii) when DS3 PLCP synchronism is detected and besides EC1 out-of-synchronism is detected, the H1, H2 all "1" through inhibit is valid;

(iii) when DS3 PLCP out-of-synchronism is detected and besides EC1 synchronism is detected, the H1, H2 all "1" through inhibit is invalid; and (iv) when DS3 PLCP out-of-synchronism is detected and besides EC1 out-of-synchronism is detected, the H1, H2 all "1" through inhibit is valid (preceding state maintained).

(b) Upon preceding frame EC1 reception, the H1, H2 inhibit control section 252 operates in the following manner as illustrated in FIG. 10B:

(i) when DS3 PLCP synchronism is detected and besides EC1 synchronism is detected, the H1, H2 all "1" through inhibit is invalid (preceding state preferential);

(ii) when DS3 PLCP synchronism is detected and besides EC1 out-of-synchronism is detected, the H1, H2 all "1" through inhibit is valid;

(iii) when DS3 PLCP out-of-synchronism is detected and besides EC1 synchronism is detected, the H1, H2 all "1" through inhibit is invalid; or (iv) when DS3 PLCP out-of-synchronism is detected and besides EC1 out-of-synchronism is detected, the H1, H2 all "1" through inhibit is invalid (preceding state maintained).

The H1, H2, all "1" insertion section 254 ignores, (a) when an inhibit valid instruction is received from the H1, H2 inhibit control section 252, the outputs of the PTR production section 186 and the H1, H2, all "1" through section 182 and outputs a predetermined value for mapping the DS3 signal to the STS-1 signal. However, (b) when an inhibit invalid instruction is received from the H1, H2 inhibit control section 252, the H1, H2, all "1" insertion section 254 outputs an H1, H2 all "1" if the H1, H2, all "1" through section 182 detects all "1s", but passes the pointer value of the PTR production section 186 therethrough if the H1, H2, all "1" through section 182 does not detect all "1s".

The selector 126 selects one of four STS-1 outputs of the STS-1 MUX section 116, DS3 STM MUX section 118, DS3 direct ATM MUX section 120 and DS3 PLCP ATM MUX section 122. In particular, (a) when the EC1 synchronism section 158 detects EC1 synchronism, the selector 126 selects the output of the STS-1 MUX section 116; (b) when the DS3 PLCP synchronism detection section 250 detects DS3 PLCP synchronism, the selector 126 selects the output of the DS3 PLCP ATM MUX section 122; (c) when the DS3 synchronism section 190 detects DS3 synchronism and the DS3 frame is an STM, the selector 126 selects the output of the DS3 STM MUX section 118; and (d) when the DS3 direct synchronism detection section 253 detects a direct ATM, the selector 126 selects the output of the DS3 direct ATM MUX section 120. The STS-3 MUX section 128 maps the STS-1×3 frames to the payload of an STS-3 frame.

Figure 11:
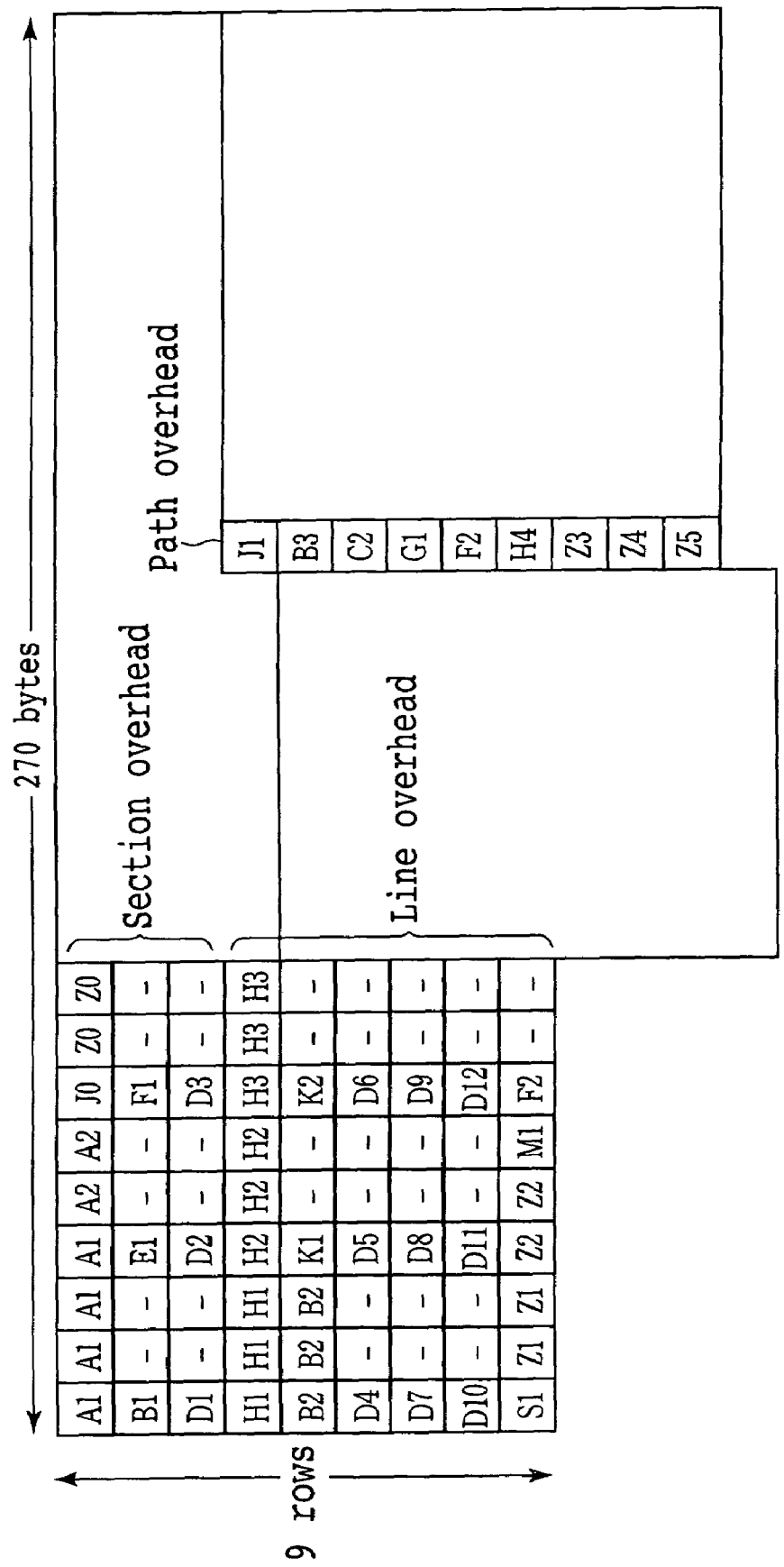
FIG. 11 is a view showing an STS-3 frame format.
Figure 13A:
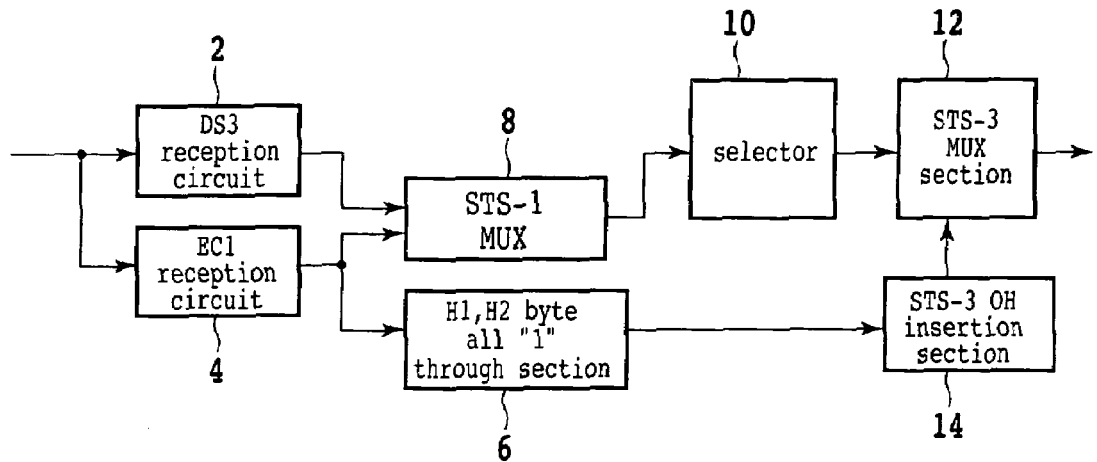
FIGS. 13A, 13B and 13C are block diagrams illustrating a problem of a conventional ADM apparatus.
Figure 13B:
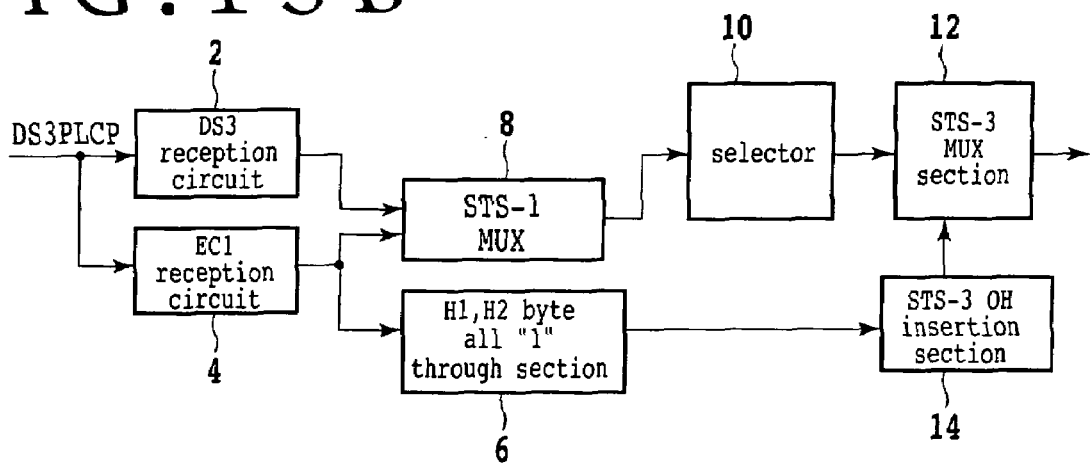
Figure 13C:
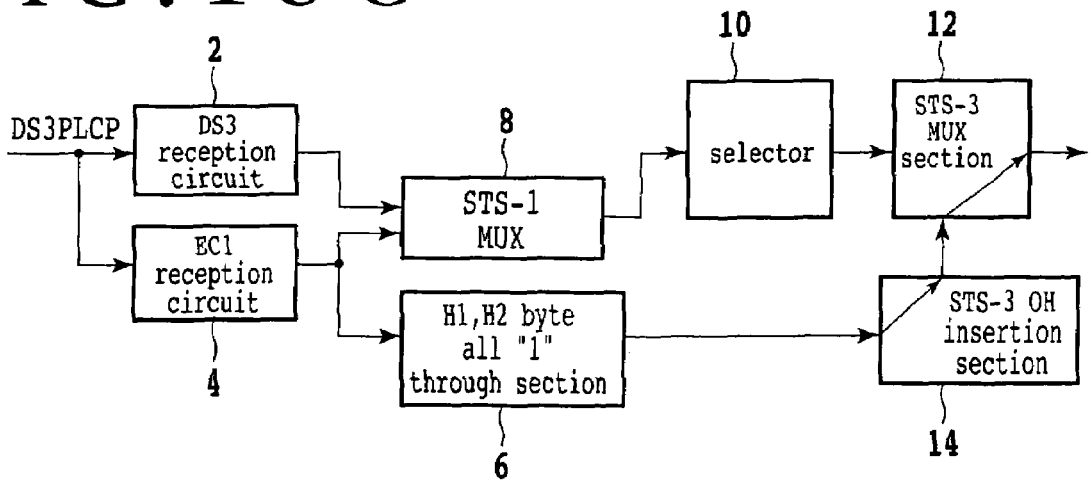

FIG. 11 illustrates the STS-3 frame format. Referring to FIG. 11, the STS-3 frame includes a section overhead, a line overhead, a path overhead and a payload. The section overhead includes A1×3 bytes, A2×3 bytes, a B1 byte, D1 to D3 bytes, an E1 byte, an F1 byte, H1×3 bytes, H2×3 bytes, H3×3 bytes, a J0 byte, and Z0×2 bytes. The line overhead includes B2×3 bytes, D4 to D12 bytes, K1, K2 bytes, an S1 byte, Z1×2 bytes, Z2×2 bytes, an M1 byte and an F2 byte. The path overhead includes a J1 byte, a B3 byte, a C2 byte, a G1 byte, an F2 byte, an H4 byte and Z3 to Z5 bytes.

The STS-3 overhead insertion section 130 includes an H1, H2, H3 production section 280, an A1, A2 byte production section 282, an STS S/L OH insertion section 284, an SCR section 286 and a B1 calculation (Cal) section 288. The H1, H2, H3 production section 280 (a) outputs all "1s" to the pertaining H1, H2 bytes of the H1×3 and H2×3 bytes when an H1, H2 all "1" is outputted from the H1, H2, all "1" insertion section 254 but (b) outputs a pointer value of the pertaining bytes of the H1×3 and H2×3 bytes when an H1, H2 all "1" is not outputted from the H1, H2, all "1" insertion section 254.

The A1, A2 byte production section 282 produces the A1, A2 bytes. The B1 calculation section 288 calculates the B1 byte. The SCR section 286 scrambles data of a frame. The STS S/L overhead insertion section 284 produces the section/line overhead of an STS-3 frame based on outputs of the H1, H2, H3 production section 280, A1, A2 byte production section 282 and B1 calculation section 288.

In the following, operation of the transmission apparatus 100#1 shown in FIG. 2 according to the present invention is described.

(1) When the transmission apparatus 100#1 receives a DS3 PLCP frame:

When the transmission apparatus 100#1 receives a DS3 PLCP frame from the DS3 network 106#1, the DS3 reception circuit 114 detects DS3 frame synchronism and further detects PLCP frame synchronism. The EC1 reception circuit 112 detects EC1 frame synchronism. At this time, since the framing pattern of the EC1 frame and the framing pattern of the PLCP frame are same as each other, the DS3 PLCP frame is sometimes recognized as an EC1 frame and synchronism of the EC1 frame may be established temporarily.

Since DS3 synchronism and PLCP synchronism are detected with regard to both of the preceding and current DS3 PLCP frames, the inhibit section 124 validates the inhibit and, even if an H1, H2 byte all "1" is detected, invalidates this. Since the DS3 synchronism and the PLCP synchronism are detected, the selector 126 selects the STS-1 frame in which a DS3 PLCP ATM is mapped.

Since the STS-3 overhead insertion section 130 receives an inhibit valid instruction from the inhibit section 124, it produces the H1, H2 bytes and the other overheads and inserts the STS-3 overhead into the STS-3 frame. The STS-3 frame wherein the DS3 PLCP frame is mapped to the payload and which includes the overhead whose H1, H2 bytes are not all "1s" is transmitted.

Since the H1, H2 bytes of the STS-3 frame are not all "1s", the transmission apparatus 100#2 on the reception side successively demaps the STS-3 frame to STS-1 and DS3 PLCP frames and ATM cells and drops the ATM cells to the ATM apparatus 110#2. In this manner, also if the EC1 reception circuit 112 recognizes, during reception of a DS3 PLCP signal, that the DS3 PLCP signal is an EC1 frame and detects the "H1, H2 byte all "1"", the H1, H2 byte all "1" is inhibited and consequently the DS3 PLCP signal can be transmitted to the reception side.

(2) When the transmission apparatus 100#1 receives a DS3 frame immediately after reception of an EC1 frame:

When an EC1 frame is being received, the EC1 reception circuit 112 performs EC1 frame synchronism detection and detects the H1, H2 bytes in accordance with the EC1 frame synchronism. The inhibit section 124 invalidates the inhibition since EC1 frame synchronism is established in the preceding and current EC1 frames.

If the detected H1, H2 bytes are all "1s", then the inhibit section 124 produces an H1, H2 byte all "1". The selector 126 selects an STS-1 frame to which the EC1 frame is mapped. The STS-3 MUX section 128 maps the STS1×3 frames to the payload of an STS-3 frame.

Since an inhibit invalid instruction is received from the inhibit section 124, the STS-3 overhead insertion section 130 inserts, if the "H1, H2 byte all "1" is detected, all "1s" into the H1, H2 bytes and produces the other overheads, and then inserts the STS-3 overhead into the STS-3 frame.

It is assumed that the transmission apparatus 100#1 first receives EC1 frames and then receives a DS3 PLCP frame from the EC1 network 108#1 as a result of switching or the like. Although the EC1 reception circuit 112 first maintains EC1 frame synchronism, since the DS3 frame is received, the EC1 reception circuit 112 is placed into out-of-synchronism and outputs an EC1 out-of-synchronism signal, and besides detects the H1, H2 byte all "1" from the top of the frame in accordance with the timing while the synchronism has been maintained immediately prior.

On the other hand, the DS3 reception circuit 114 detects DS3 frame synchronism and further detects, if the frame is a PLCP frame, PLCP synchronism. The inhibit section 124 validates the inhibition because EC1 frame synchronism is not established and DS3 synchronism and DS3 PLCP synchronism are established so that, even if the H1, H2 byte all "1" is detected, it invalidates the same.

The selector 126 selects the STS-1 frame in which the DS3 frame (one of the DS3 STM, DS3 direct ATM and DS3 PLCP ATM) is mapped.

The STS-3 MUX section 128 maps the STS1×3 frames to the payload of the STS-3 frame. The STS-3 overhead insertion section 130 produces the H1, H2 and H3 bytes for the STS-3 frame and inserts the STS-3 overheads into the STS-3 frame.

Consequently, even if the contents of the EC1 frame corresponding to the H1, H2 bytes in the data in the DS3 PLCP frame are all "1s", the detection of the H1, H2 byte all "1" is invalidated and the STS-3 frame in which the DS3 frame is mapped is transmitted.

FIG. 12 shows those blocks of the transmission apparatus 100#1 shown in FIG. 2 which relate to dropping. Referring to FIG. 12, the transmission apparatus 100#1 includes an STS-3 demultiplexing section 300, an STS-1 demapping section 302, an inhibit section 304, an EC1 mapping section 306, a DS3 synchronism section 308, a PLCP synchronism section 310, a DS3 STM mapping section 312, a DS3 direct ATM mapping section 314, a DS3 PLCP ATM mapping section 316 and a selector 318.

The STS-3 demultiplexing section 300 demultiplexes an STS-3 frame into three STS-1 frames. The STS-1 demapping section 302 detects synchronism of the STS-1 frames and performs check of the overheads such as detection of the H1, H2 byte all "1" and extraction of the payload. The STS-1 demapping section 302 includes an STS-1 synchronism section 330 and an H1, H2 byte all "1" through section 332.

The STS-1 synchronism section 330 detects synchronism from the framing bytes of the STS-1 frames. At this time, since the framing byte of the STS-1 frames and the framing byte of the PLCP frame are same as each other, the STS-1 synchronism section 330 sometimes detects synchronism not from the framing byte of the STS-1 frames but from the framing byte of a PLCP frame. The H1, H2 byte all "1" through section 332 detects the H1, H2 byte all "1s" based on the synchronism by the STS-1 synchronism section 330.

The inhibit section 304 controls the validity-invalidity of inhibit of the H1, H2 byte all "1" based on outputs of the STS-1 synchronism section 330, DS3 synchronism section 308, PLCP synchronism section 310 and DS3 direct ATM mapping section 314 similarly as with the truth values of FIGS. 10A and 10B. Here, the STS-1 synchronism corresponds to the EC1 synchronism.

Further, the inhibit section 304 issues an instruction to the selector 318 to select the output of the DS3 PLCP ATM mapping section 316, DS3 direct ATM mapping section 314, DS3 STM mapping section 312 and EC1 mapping section 306 (a) when DS3 synchronism is detected and PLCP synchronism is detected, (b) when DS3 synchronism is detected and PLCP synchronism is not detected and besides an ATM cell is detected, (c) when DS3 synchronism is detected and PLCP synchronism is not detected and besides an ATM cell is not detected and (d) in any other case, respectively.

The EC1 mapping section 306 maps the payload to the EC1 frame. The DS3 synchronism section 308 detects synchronism of the DS3 frame. The PLCP synchronism section 310 detects synchronism of the PLCP frame. The DS3 STM mapping section 312 extracts STM data from the DS3 frame and maps the STM data to the DS3 frame.

The DS3 direct ATM mapping section 314 detects whether or not an ATM cell is mapped in the DS3 frame, and outputs an ATM cell detection signal to the inhibit section 304 and maps the ATM cell to the DS3 frame. The DS3 PLCP ATM mapping section 316 maps the ATM cell to the PLCP frame. The selector 318 selects in accordance with the instruction of the inhibit section 304.

Since the inhibit section 304 controls the inhibit of through-transmission of the H1, H2 byte all "1", even when a PLCP frame is recognized as an STS-1 frame, the PLCP frame can be dropped because the H1, H2 byte all "1" is inhibited.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A transmission apparatus, comprising:
   a first synchronism section for detecting synchronism of a reception frame based on a first framing pattern of a first type frame;
   a second synchronism section for detecting synchronism of the reception frame based on a second framing pattern of a second type frame;
   a mapping section for mapping the reception frame to a third type frame based on the detections of synchronism by said first and second synchronism sections; and
   an inhibit section for judging that a current reception frame is said first type frame when said first synchronism section has detected the synchronism in a preceding reception frame, which is a previous frame of the current reception frame in a time axis, and said first and second synchronism sections detect the synchronisms in the current reception frame, and invalidating fault information set in a fourth type frame, wherein a head position of said each reception frame is determined by one of said first and second framing patterns for frame synchronism, each reception frame only containing one of said first and second type frames, and a frame header of said first type frame, which contains said first framing pattern, is different from a frame header of said second type frame, which contains said second framing pattern.

2. A transmission apparatus, comprising:
   a first synchronism section for detecting synchronism of a reception frame based on a first framing pattern of a first type frame;
   a fault information detection section for detecting, based on the detection of synchronism by said first detection section, whether or not fault information is set in a first predetermined region of an overhead of the first type frame and outputting a signal representative of whether or not the fault information is set;
   a second synchronism section for detecting synchronism of the reception frame based on a second framing pattern of a second type frame;
   a mapping section for mapping the reception frame to a third type frame based on the detections of synchronism by said first and second synchronism sections;
   an inhibit section for invalidating the output signal of said fault information detection section when judging a current reception frame is said first type frame in response to synchronism detection conditions of a preceding reception frame, which is a previous frame of the current reception frame in a time axis, by said first and second synchronism sections and the synchronism detection conditions of the current reception frame by said first and second synchronism sections;
   a multiplexing section for multiplexing the third type frame into a fourth type frame; and
   an overhead insertion section for inserting an overhead of the fourth type frame;
   wherein said overhead insertion section does not set fault information to a second predetermined position of the overhead when the output signal of said fault information detection section is invalidated by said inhibit section, a head position of said each reception frame is determined by one of said first and second framing patterns for frame synchronism, each reception frame only containing one of said first and second type frames, and a frame header of said first type frame, which contains said first framing pattern, is different from a frame header of said second type frame, which contains said second framing pattern.

3. A transmission apparatus, comprising:
   a first synchronism section for detecting synchronism when a reception frame received from a reception port is a first type frame of a first framing pattern;
   a fault information detection section for detecting, based on the detection of synchronism by said first synchronism section, whether or not fault information is set in the first predetermined region of an overhead of the first type frame and outputting a signal representative of whether or not the fault information is set;
   a second synchronism section for detecting synchronism when the reception frame received from said reception port is a second type frame of a third framing pattern;
   a third synchronism section for detecting synchronism when the reception frame received from said reception port is a third type frame accommodated in the second type frame and having a second framing pattern same as the first framing pattern;
   a mapping section for mapping, based on the synchronism detected by said first, second and third synchronism sections, data accommodated in one of the first type frame, second type frame and third type frame to a fourth type synchronous frame;
   an inhibit section for judging that a current reception frame is said third type frame when the synchronism is detected by said first, second and third synchronism sections and that the synchronism is detected with regard to a preceding frame, which is a previous frame of the current reception frame in a time axis, by said second and third synchronism sections, and invalidating the output signal of said fault information detection section;
   a multiplexing section for multiplexing the fourth type synchronous frame into a fifth type synchronous frame; and
   an overhead insertion section for inserting an overhead of the fifth type synchronous frame;
   wherein said overhead insertion section does not set fault information to a second predetermined position of the overhead when the output signal of said fault information detection section is invalidated by said inhibit section, a head position of said each reception frame is determined by one of said first and second framing pattern for frame synchronism, each reception frame only containing one of said first and second type frames, and a frame header of said first type frame, which contains said first framing pattern, is different from a frame header of said second type frame, which contains said second framing pattern.

4. The transmission apparatus according to claim 3, wherein said inhibit section invalidates the output signal of said fault information detection section when synchronism is not detected by said first synchronism section and besides synchronism is detected by said second and third synchronism sections.

5. The transmission apparatus according to claim 3, wherein said inhibit section validates the output signal of said fault information detection section when synchronism is detected by said first synchronism section and besides synchronism is not detected by said second or third synchronism section.

6. The transmission apparatus according to claim 3, wherein said inhibit section validates the output signal of said fault information detection section if it is discriminated, when the synchronism is detected by said first, second and third synchronism sections, that the synchronism is detected with regard to the preceding frame by said first, second and third synchronism sections and the first type frame is being received.

7. The transmission apparatus according to claim 3, wherein the first type frame is an EC1 frame and the second type frame is a DS3 frame while the third type frame is a PLCP frame.

8. A reception interface apparatus, comprising:
a demultiplexing section for demultiplexing a reception frame received from a reception port into a plurality of first type synchronous frames;
a first synchronism section for detecting synchronism when one frame of the plurality of the first type synchronous frames is a first type frame of a first framing pattern;
a fault information detection section for detecting, based on the frame synchronism detected by said first detection section, whether or not fault information is set in a first predetermined region of an overhead of the first type frame and outputting a signal representative of whether or not the fault information is set;
a second synchronism section for detecting synchronism when one frame of the plurality of the first type synchronous frames is a second type frame of a second framing pattern;
a third synchronism section for detecting synchronism when the first type frame is a third type frame accommodated in the second type frame and having a third framing pattern same as the first framing pattern;
a first mapping section for mapping, based on the synchronism detected by said first, second and third synchronism sections, data accommodated in one of the first type frame, second type frame and third type frame to a fourth frame; and
an inhibit section for judging that a current reception frame is said third type frame when the synchronisms are detected by said first, second and third synchronism sections and that the synchronisms are detected with regard to a preceding frame, which is a previous frame of the current reception frame in a time axis, by said second and third synchronism sections, and invalidating the output signal of said fault information detection section, a head position of said each first type frame is determined by one of said first and second framing patterns for frame synchronism, each first type frame only containing one of said second and fourth type frames, and a frame header of said first type frame, which contains said first framing pattern, is different from a frame header of said second type frame, which contains said second framing pattern.

9. A transmission apparatus, comprising:
a first demultiplexing section for demultiplexing a first type synchronous frame received from a synchronous network into a plurality of second type synchronous frames;
a first synchronism section for establishing synchronism with a first framing pattern of one of the second type synchronous frames;
a first demapping section for detecting fault information set in an overhead of the second type synchronous frame and demapping the fault information to a payload of the second type synchronous frame;
a first mapping section for mapping the payload to a third type synchronous frame;
a second synchronism section for establishing synchronism when the payload is a fourth type synchronous frame of a second framing pattern;
a third synchronism section for establishing synchronism with a fifth type synchronous frame of a third framing pattern same as the first framing pattern when the payload is accommodated in the fourth type synchronous frame and includes the fifth type synchronous frame;
a second mapping section for mapping the payload to the fourth type synchronous frame which accommodates the fifth type synchronous frame; and
an inhibit section for judging that a current payload is the fifth type frame when synchronism is detected by said second and third synchronism sections and invalidating the fault information, wherein a head position of said each second and fourth type synchronous frames is determined by one of said first and second framing patterns for frame synchronism, each second type frame only containing one of said third and fourth type synchronous frames, and a frame header of said first type synchronous frame, which contains said first framing pattern, is different from a frame header of said fourth type synchronous frame, which contains said second framing pattern.

10. The transmission apparatus according to claim 1, wherein said mapping section comprises a first mapping section for mapping the reception frame to said third type frame based on the detection of synchronism by the first synchronism section and a second mapping section for mapping the reception frame to the fourth type frame based on the detection of synchronism by said second synchronism section, said transmission apparatus further comprising a sector section for selecting one of outputs of said first and second mapping sections based on the detections of synchronism by the first and second synchronism sections.

11. The transmission apparatus according to claim 2, wherein said mapping section comprises a first mapping section for mapping the reception frame to said third type frame based on the detection of synchronism by the first synchronism section and a second mapping section for mapping the reception frame to the fourth type frame based on the detections of synchronism by said first, second and third synchronism sections, said transmission apparatus further comprising a selector section for selecting one of outputs of said first and second mapping sections based on the detections of synchronism by the first, second and third synchronism sections.

12. The transmission apparatus according to claim 3, wherein said mapping section comprises a first mapping section for mapping the reception frame to said fourth type frame based on the detection of synchronism by the first synchronism section and a second mapping section for mapping the reception frame to the fifth type frame based on the detections of synchronism by said second and third synchronism sections, said transmission apparatus further comprising a selector section for selecting one of outputs of said first and second mapping sections based on the detections of synchronism by the first, second and third synchronism sections.

13. The reception interface apparatus according to claim 8, wherein said first mapping section comprises a second mapping section for mapping, based on the synchronism detected by said first synchronism section, data accommodated in the first type frame to said fourth type frame and a third mapping section for mapping, based on the synchronism detected by said first, second and third synchronism sections, data accommodated in the second type frame to said fourth type frame, said reception interface apparatus further comprising a selector section for selecting one of outputs of said first and second mapping sections based on the detections of synchronism by the first, second and third synchronism sections.

14. The transmission apparatus according to claim 9 further comprising: a third mapping section for mapping, based on the synchronism detected by said first and second synchronism sections, the payload to the fourth type synchronous frame which does not include the fifth type synchronous frame, and a selector section for selecting one of outputs of said first, second and third mapping sections based on the detections of synchronism by the first, second and third synchronism sections.

* * * * *